(12) United States Patent
Abdelmalek et al.

(10) Patent No.: US 11,588,771 B2
(45) Date of Patent: *Feb. 21, 2023

(54) SYSTEMS AND METHODS FOR INCLUDING ENRICHED CALLING INFORMATION IN RICH COMMUNICATIONS SERVICES (RCS) MESSAGING

(71) Applicant: Verizon Patent and Licensing Inc., Basking Ridge, NJ (US)

(72) Inventors: Yousef Abdelmalek, New Providence, NJ (US); Sethumadhav Bendi, Walnut Creek, CA (US); Hesham Elbatouti, Madison, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/452,851

(22) Filed: Oct. 29, 2021

(65) Prior Publication Data

US 2022/0045977 A1 Feb. 10, 2022

Related U.S. Application Data

(63) Continuation of application No. 16/592,956, filed on Oct. 4, 2019, now Pat. No. 11,178,084.

(51) Int. Cl.
| | | |
|---|---|---|
| *G06F 15/16* | (2006.01) |
| *H04L 51/10* | (2022.01) |
| *H04L 67/02* | (2022.01) |
| *H04L 65/1069* | (2022.01) |
| *H04L 65/1016* | (2022.01) |
| *H04L 51/02* | (2022.01) |
| *H04L 65/1104* | (2022.01) |
| *H04L 67/01* | (2022.01) |

(52) U.S. Cl.
CPC ............. *H04L 51/10* (2013.01); *H04L 51/02* (2013.01); *H04L 65/1016* (2013.01); *H04L 65/1069* (2013.01); *H04L 65/1104* (2022.05); *H04L 67/02* (2013.01); *H04L 67/01* (2022.05)

(58) Field of Classification Search
None
See application file for complete search history.

(56) References Cited

U.S. PATENT DOCUMENTS

2011/0014933 A1* 1/2011 Karmarkar ............. H04W 4/02
455/466
2019/0356704 A1* 11/2019 Jernström ........... H04L 65/1069

* cited by examiner

*Primary Examiner* — Wing F Chan
*Assistant Examiner* — Andrew Woo (57) ABSTRACT

A messaging platform may send, based on a query, information identifying one or more virtual assistants to a user device. The messaging platform may receive, from the user device, a response identifying a particular virtual assistant, of the one or more virtual assistants, wherein the virtual assistant is associated with an organization. The monitoring platform may send, to the user device, information related to the particular virtual assistant and may communicate, via the particular virtual assistant, with the user device via a rich communications services (RCS) communication session. The messaging platform may receive, from another device associated with the organization, a request to communicate with the user device and may convert the request into an RCS message. The messaging platform may send, via a server device, the RCS message to the user device to allow the user device to perform one or more actions.

20 Claims, 10 Drawing Sheets

SYSTEMS AND METHODS FOR INCLUDING ENRICHED CALLING INFORMATION IN RICH COMMUNICATIONS SERVICES (RCS) MESSAGING

RELATED APPLICATION

This application is a continuation of U.S. patent application Ser. No. 16/592,956, entitled "SYSTEMS AND METHODS FOR INCLUDING ENRICHED CALLING INFORMATION IN RICH COMMUNICATIONS SERVICES (RCS) MESSAGING," filed Oct. 4, 2019, which is incorporated herein by reference in its entirety.

BACKGROUND

Rich communication services (RCS) is a communication protocol between mobile devices and carriers. RCS provides text-message capabilities similar to short message service (SMS) messages, however, RCS is capable of providing services that SMS cannot provide, such as voice calling, transmitting in-call multimedia, and/or the like.

DETAILED DESCRIPTION OF PREFERRED EMBODIMENTS

The following detailed description of example implementations refers to the accompanying drawings. The same reference numbers in different drawings may identify the same or similar elements.

In some instances, an organization (e.g., a representative of the organization) uses a client device to initiate a call with a user of a user device (this is sometimes referred to as application to person (A2P) calling). In many cases, as part of the call attempt, the client device sends calling information to the user device. The calling information may include a mobile directory number (MDN) and/or a service identifier (e.g., that may be identified using, for example, a dialed number identification service (DNIS)) associated with the client device. Often, the user device displays the calling information on a display of the user device and the user of the user device can decide how to handle the call (e.g., to answer, block, or ignore the call). However, the calling information often provides an insufficient basis to make a decision about how to handle the call. Moreover, because of unwanted spam calls, spoof calls, robocalls, and/or the like, the user may distrust the calling information and decide not to answer the call.

This can result in legitimate calls (e.g., calls from organizations that have preexisting relationships with users) being blocked or ignored. Moreover, an organization may have to use computing resources (e.g., processing resources, memory resources, power resources, memory resources, and/or the like) to make repeat calls and/or attempt to contact a user using different methods (e.g., electronic messaging).

Some implementations described herein provide a messaging platform that includes enriched calling information in a rich communications services (RCS) message (e.g., an RCS message associated with a request to call a user device from a client device). In some implementations, the messaging platform may send the RCS message to the user device to allow the user device to display some or all of the enriched calling information on a display of the user device. In some implementations, the enriched calling information may include information indicating a priority of the request, information indicating a subject of the request, a media item associated with an organization that is associated with the client device, a uniform resource locator (URL) associated with the media item, a verified signature associated with the organization, a URL associated with the organization; a location associated with the organization, and/or the like. In this way, a user of the user device may see the enriched calling information on the display of the user device and, because the enriched calling information provides more information than the calling information, may be more likely to answer the call.

Moreover, in some implementations, the messaging platform may host a virtual assistant that interacts with the user of the user device (e.g., prior to the client device attempting to call the user device). In some implementations, the virtual assistant may be associated with the organization and the messaging platform may send information related to the virtual assistant to the user device. In some implementations, the user device may compare the information related to the virtual assistant to the enriched calling information to verify that the enriched calling information is associated with the organization. In some implementations, the user device may decide to display, or not to display, the enriched calling information based on the comparison. Therefore, enriched calling information associated with an organization is displayed on the display of user device only when the user device has previously engaged with a virtual assistant associated with the organization. Accordingly, when the user device displays the enriched calling information, which indicates that the call is associated with an organization with which the user has previously interacted, the user may be more likely to accept the call.

This may also prevent unwanted and/or unverified enriched calling information (e.g., sent by spammers, robocallers, and/or the like) from being displayed on the user device.

In this way, the messaging platform increases a likelihood that a call will be accepted by a user of user device, thereby reducing a need to make repeat calls or attempts to contact the user by other means.

FIGS. 1A-1F are diagrams of one or more example implementations 100 described herein. Example implementation(s) may include a messaging platform 210, a user device 220, a client device 230, a content server device 240, and/or a rich communication services (RCS) server device 250 (as described herein in relation to FIG. 2). The messaging platform 210, the content server device 240, and/or the RCS server device 250 may be associated with a wireless telecommunications network.

Figure 1A:
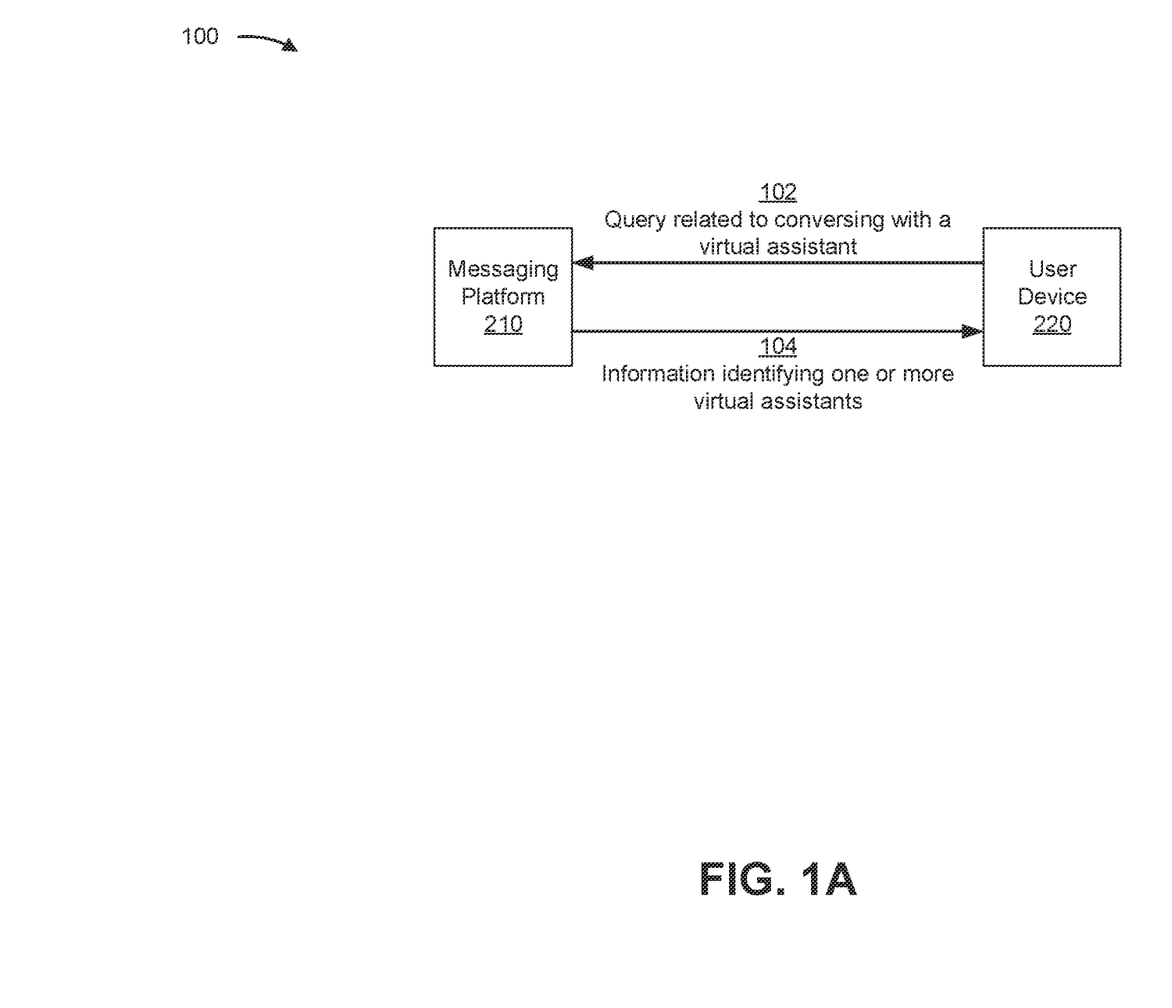
FIGS. 1A-1F are diagrams of one or more example implementations described herein.

As shown in FIG. 1A and by reference number 102, the user device 220 may send a query related to conversing with a virtual assistant (e.g., a chatbot, an interactive voice response system (IVR), an interactive avatar, and/or the like) to the messaging platform 210. The query may be a hypertext transfer protocol (HTTP) message or any other type of message. In some implementations, a user may interact with a user interface of the user device 220 to cause the user device 220 to run a program (e.g., a mobile device application, a desktop computer application, and/or the like) that enables the user to input information (e.g., a keyword search) into the user device 220 that causes the user device 220 to generate and send the query to the messaging platform 210. For example, the user may enter, via the user interface of the user device 220, one or more keywords to find a relevant virtual assistant with which to interact. The one or more keywords may identify an organization (e.g., a company), a topic (e.g., a current events topic), an item (e.g., a consumer product), a category (e.g., clothes, sports equipment, and/or the like), and/or the like.

As shown by reference number 104, the messaging platform 210 may send information identifying one or more virtual assistants to the user device 220. For example, the messaging platform 210 may search, based on the query, a data structure that stores information identifying a plurality of virtual assistants. The messaging platform 210 may determine that one or more virtual assistants are relevant to the query and may send the information identifying the one or more virtual assistants to the user device 220. The user device 220 may display the information identifying the one or more virtual assistants on a display of the user device 220.

A virtual assistant may be associated with an organization (e.g., a company, a financial institution, a religious organization, a nonprofit organization, a brand, a person or character, and/or the like). For example, a company may provide a virtual assistant that interacts with customers to provide information, such a location of the company, operating hours of the company, order information related to a product of the company, and/or the like. The messaging platform 210 may host the virtual assistant (e.g., the messaging platform 210 may use the virtual assistant to interact with a user that uses the user device 220).

Figure 1B:
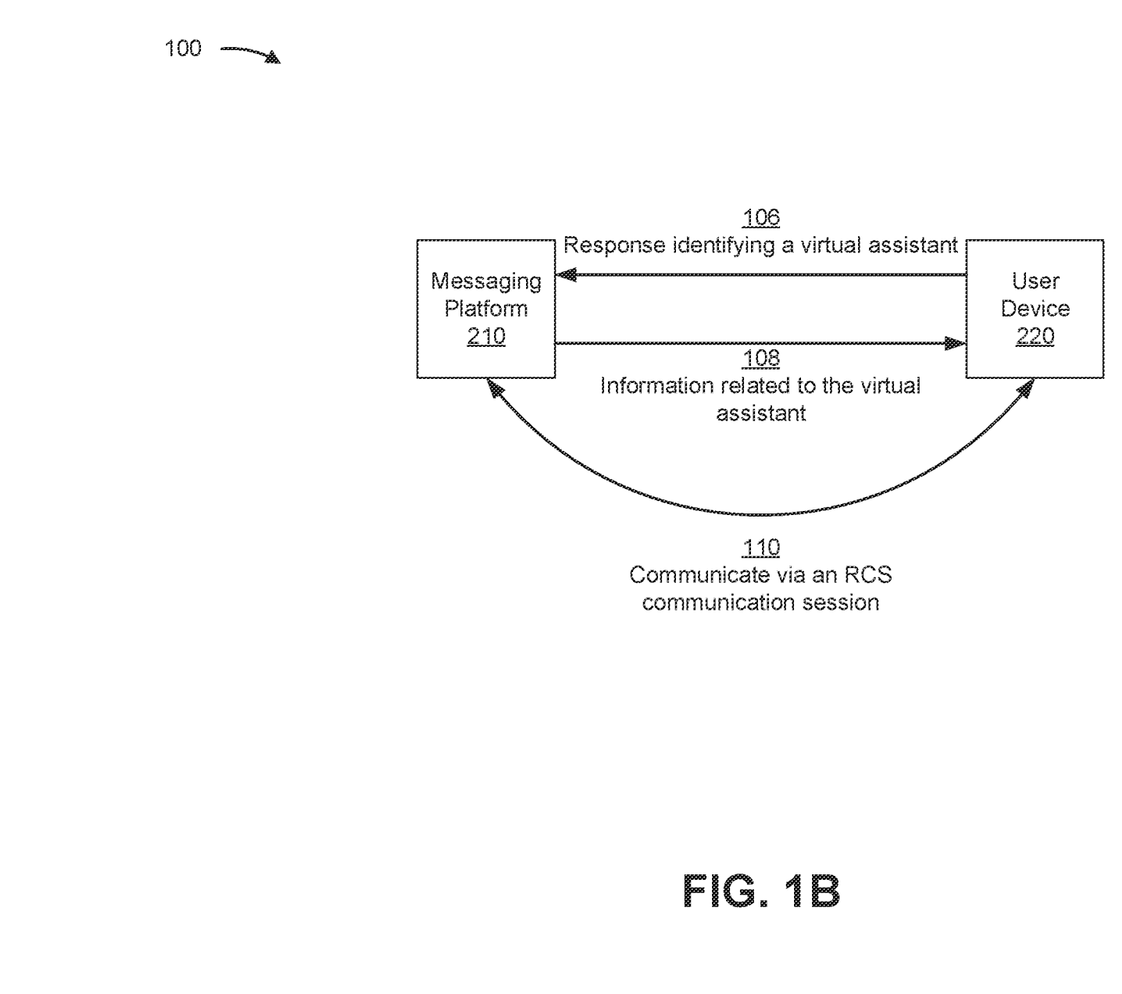

As shown in FIG. 1B and by reference number 106, the user device 220 may send a response identifying a virtual assistant (e.g., a particular virtual assistant of the one or more virtual assistants). The response may be an HTTP message or any other type of message. In some implementations, the user device 220 (e.g. based on running the program) may allow the user to enter (e.g., via the user interface of the user device 220) input related to the one or more virtual assistants (e.g., a preference for a virtual assistant of the one or more virtual assistant) that causes the user device 220 to generate and send the response to the messaging platform 210. For example, the user device 220 may process the input to identify and/or select a virtual assistant and may generate a response that indicates a request to initiate an RCS communication session with the virtual assistant (e.g., for the user, using the user device 220, to interact with the virtual assistant).

As shown by reference number 108, the messaging platform 210 may send information related to the virtual assistant to the user device 220. For example, messaging platform 210 may search, based on the response, a data structure to obtain the information related to the virtual assistant and may send the information related to the virtual assistant to the user device 220. The information related to the virtual assistant may include a media item (e.g., a picture, a video, a song, and/or the like) associated with the virtual assistant or the organization that is associated with the virtual assistant; a verified signature associated with the virtual assistant or the organization; a URL associated with the virtual assistant or the organization; a location (e.g., a geographic location, such as a physical address) associated with the virtual assistant or the organization; and/or the like. The user device 220 may display the information related to the virtual assistant on the display of the user device 220 and/or may store the information related to the virtual assistant in a data structure of the user device 220.

In some implementations, the messaging platform 210 may initiate, based on the response, an RCS communication session (e.g., to allow a user of the user device 220 to interact with the virtual assistant hosted by the messaging platform 210). As shown by reference number 110, the messaging platform 210 may communicate with the user device 220 via the RCS communication session. For example, the messaging platform 210 may use the virtual assistant to communicate with the user device 220 (e.g., send RCS messages to the user device 220 and/or receive RCS messages from the user device 220 (e.g., via the RCS server device 250)).

In some implementations, after the RCS communication session has been established between the messaging platform 210 and the user device 220 (e.g., while the messaging platform 210 and the user device 220 are communicating via the RCS communication session or after the messaging platform 210 and the user device 220 have finished communicating via the RCS communication session), the client device 230 may attempt to communicate with the user device 220. The client device 230 may be associated with the organization that is associated with the virtual assistant.

Figure 1C:
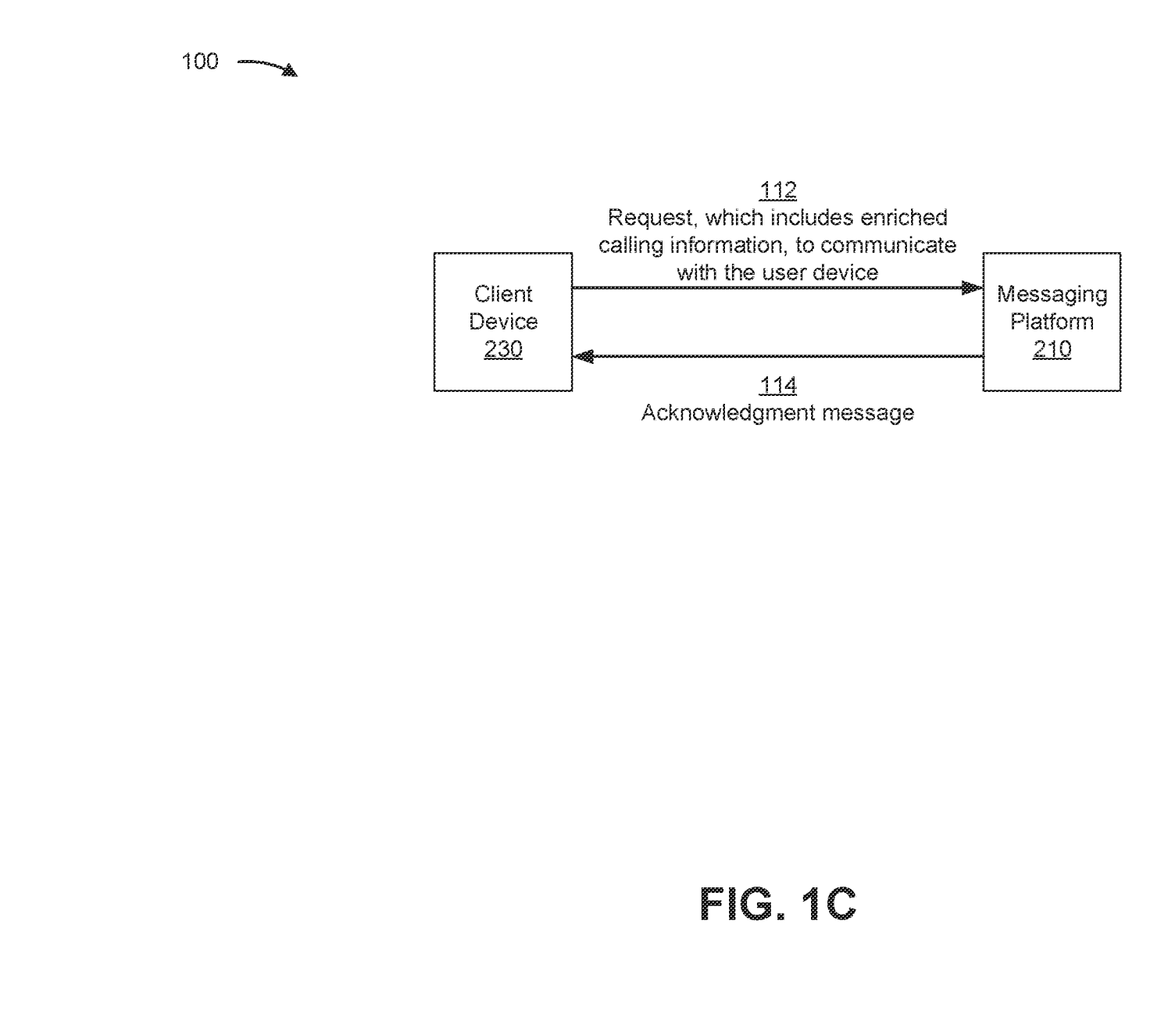

As shown in FIG. 1C and by reference number 112, the client device 230 may send a request to communicate with the user device 220 to the messaging platform 210. The request message may be an HTTP message. The request message may include enriched calling information (e.g., additional information other than a device identifier (e.g., a mobile directory number (MDN)) and/or a service identifier (e.g., that may be identified using, for example, a dialed number identification service (DNIS)) associated with the client device 230. The enriched information may include at least one element, such as information indicating a priority of the request (e.g., a low priority, a medium priority, a high priority, a critical priority, and/or the like to indicate an importance of the request); information indicating a subject of the request; a media item (e.g., a picture, a video, a song, and/or the like) associated with the organization; a URL associated with the media item; a verified signature associated with the organization; a URL associated with the organization; a location associated with the organization; and/or the like. As shown by reference number 114, the messaging platform 210 may send an acknowledgment message to the client device 230 indicating that the request was received by the messaging platform 210.

Figure 1D:
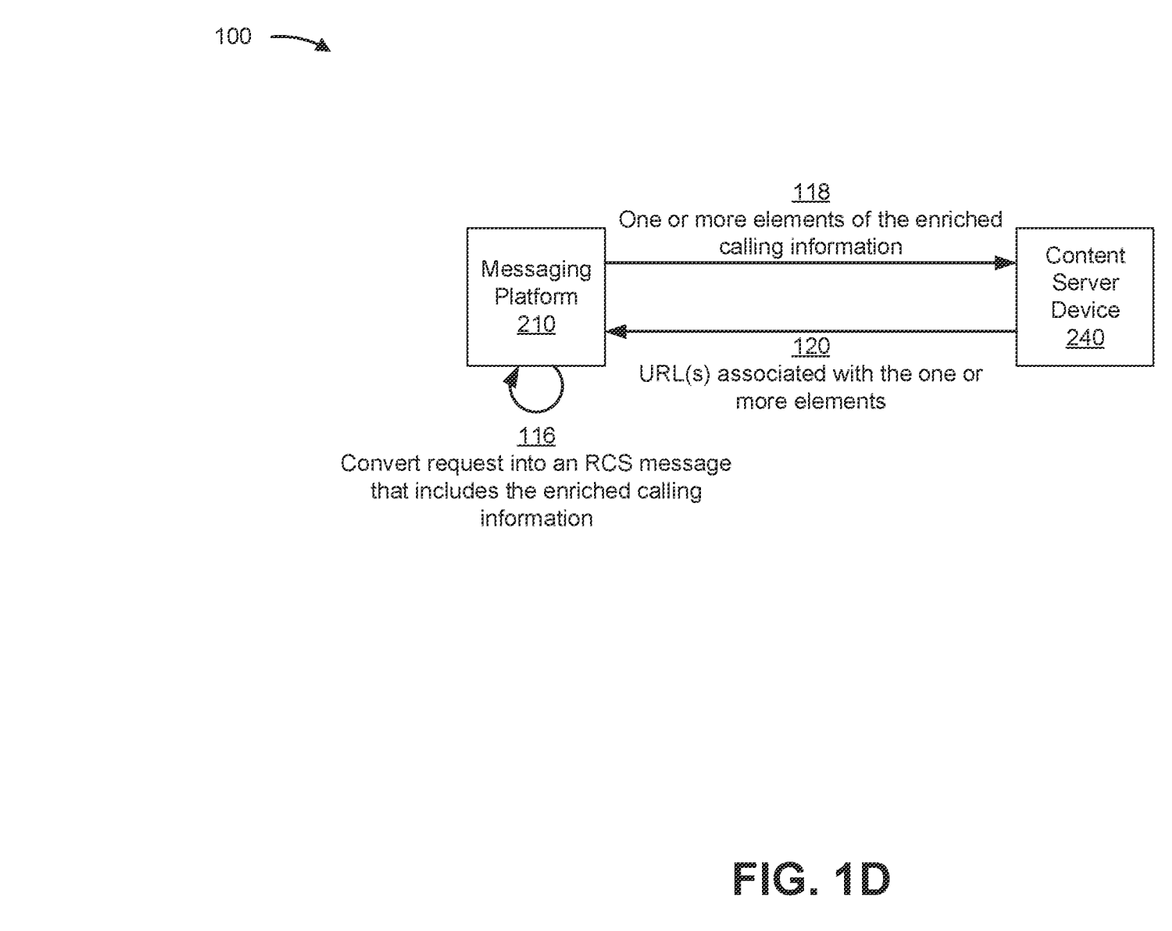

As shown in FIG. 1D and by reference number 116, the messaging platform 210 may convert the request into an RCS message. The RCS message may include the enriched calling information (e.g., that is included in the request). The RCS message may be a session initiation protocol (SIP) message, such as a SIP invite message.

As shown by reference number 118, when converting the request into the RCS message, the messaging platform 210 may identify one or more elements of the enriched calling information and may send the one or more elements to the content server device 240. The content server device 240 may store the one or more elements (e.g., in a data structure) and may generate one or more respective URLs associated with the one or more elements. As shown by reference number 120, the content server device 240 may send the one or more URLs to the messaging platform 210. Accordingly, the messaging platform 210 may cause the one or more elements to be removed from the enriched calling information and the one or more URLs to be added to the enriched calling information. The messaging platform 210 may cause the RCS message to include the enriched calling information (e.g., after updating the enriched calling information). In this way, the messaging platform 210 may send large (e.g., in terms of file size) elements to the content server device 240 so that resources of the messaging platform 210 do not need to be used to maintain (e.g., store) the elements at the messaging platform 210 and/or transmit the elements to the user device 220. This may ensure that the RCS message is transmitted to the user device 220 more quickly than if the RCS message included the elements.

As a specific example, when converting the request into the RCS message, the messaging platform 210 may identify a media item included in the enriched calling information and may send the media item to the content server device 240. The content server device 240 may send a URL associated with the media item to the messaging platform 210. The messaging platform 210 may update the enriched calling information by causing the media item to be removed from the enriched calling information and the URL associated with the media item to be added to the enriched calling information. The messaging platform 210 may cause the RCS message to include the updated enriched calling information.

Figure 1E:
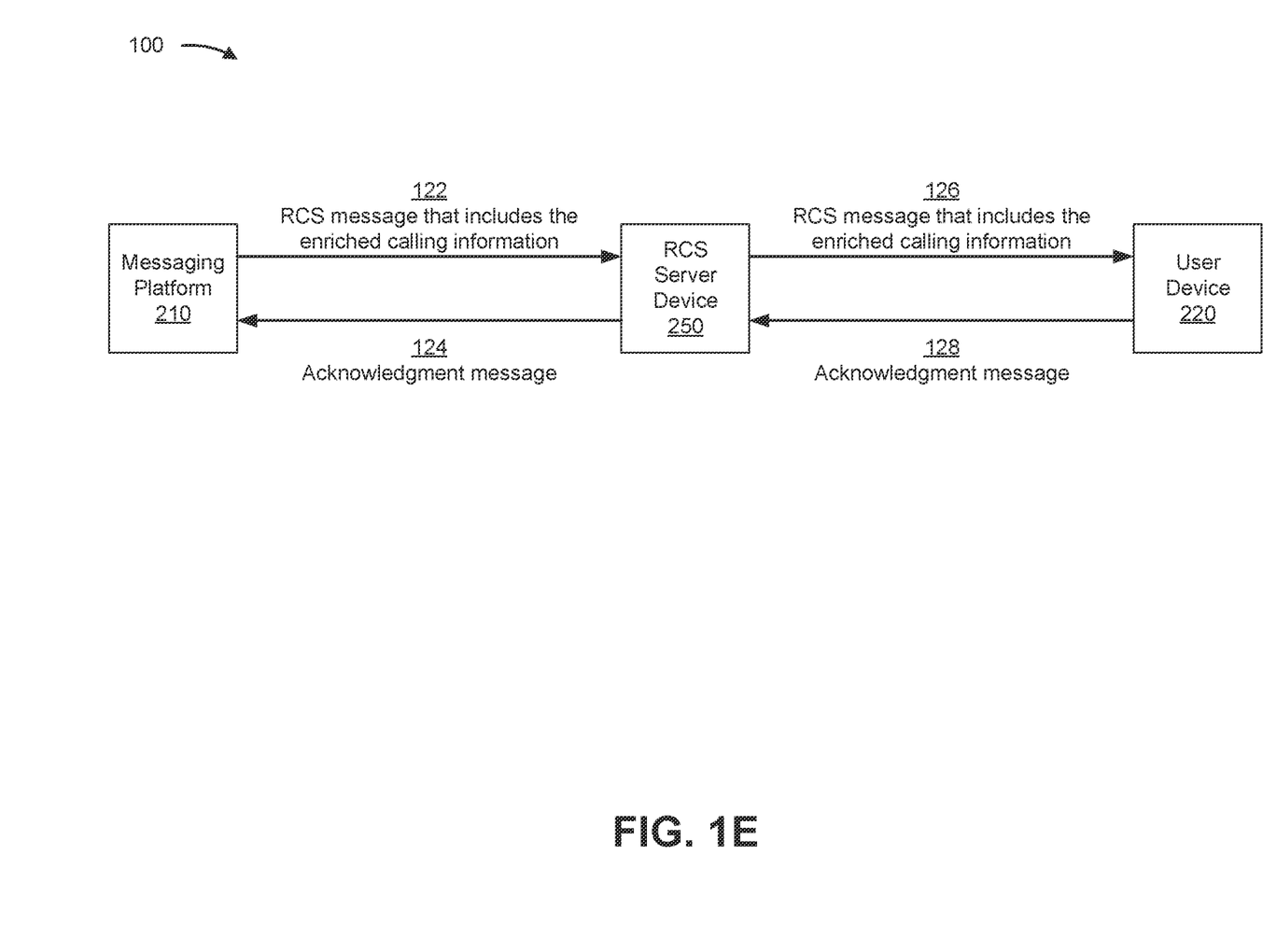

As shown in FIG. 1E and by reference number 122, the messaging platform 210 may send the RCS message to the RCS server device 250. The RCS server device 250 may be associated with an Internet protocol multimedia subsystem (IMS) core of the wireless telecommunications network. As shown by reference number 124, the RCS server device 250 may send an acknowledgment message to the messaging platform 210 indicating that the RCS server device 250 received the RCS message.

As shown by reference number 126, the RCS server device 250 may send the RCS message to the user device 220. As shown by reference number 128, the user device 220 may send an acknowledgment message to the RCS server device 250 indicating that the user device 220 received the RCS message.

Figure 1F:
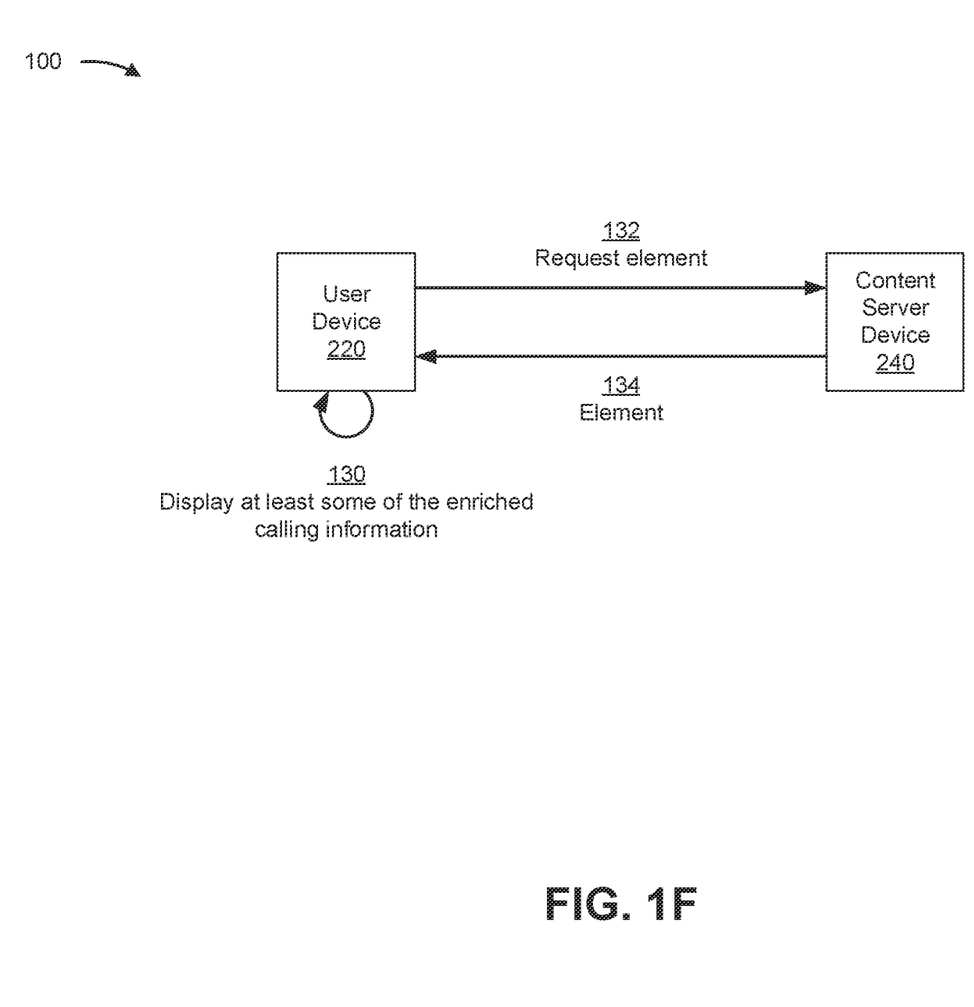

As shown in FIG. 1F, the user device 220 may perform one or more actions (e.g., based on the RCS message and/or the enriched calling information included in the RCS message). For example, as shown by reference number 130, the user device 220 may display at least some of the enriched calling information on the display of the user device 220 (e.g., the user device 220 may display the information indicating the priority of the request, the information indicating the subject of the request, the media item associated with the organization, the URL associated with the organization, the location associated with the organization, and/or the like).

In some implementations, the user device 220 may process the enriched calling information to identify the one or more URLs respectively associated with the one or more elements that were removed from the enriched calling information by the messaging platform 210 (e.g., as described herein in relation to FIG. 1D and reference numbers 118 and 120). As shown by reference number 132, the user device 220, based on the one or more URLs, may request the one or more elements from the content server device 240. As shown by reference number 134, the content server device 240 may find, based on the request, the one or more elements (e.g., in the data structure associated with the content server device 240) and may send the one or more elements to the user device 220. In this way, the user device 220 may obtain all the elements of the enriched calling information that were originally sent by the client device 230.

In some implementations, the user device 220 may determine whether one or more elements of the information related to the virtual assistant (e.g., obtained by the user device 220 from the messaging platform 210 as described herein in relation to FIG. 1B and reference number 108) match one or more elements of the enriched calling information. When the user device 220 determines that the one or more elements of the information related to the virtual assistant match the one or more elements of the enriched calling information, the user device 220 may cause at least one element of the one or more elements of the enriched calling information to be displayed on the display of the user device 220. For example, when a media item (e.g., a picture) of the information related to the virtual assistant matches a media item (e.g., a picture) of the enriched calling information, the user device 220 may display the media item of the enriched calling information on the display of the user device 220. Moreover, the user device 220 may allow an RCS communication session to be established between the user device 220 and the client device 230.

Additionally, or alternatively, when the user device 220 determines that the one or more elements of the information related to the virtual assistant do not match any element of the enriched calling information (e.g., the information related to the virtual assistant does not match the enriched calling information), the user device 220 may determine not to display any of the enriched calling information. Accordingly, the user device 220 may prevent the user device 220 from displaying the enriched calling information on the display of the user device. Additionally, or alternatively, the user device 220 may display a notification that indicates that the information related to the virtual assistant does not match the enriched calling information. Further, the user device 220 may prevent an RCS communication session from being established between the user device 220 and the client device 230.

As indicated above, FIGS. 1A-1F are provided as an example. Other examples can differ from what is described with regard to FIGS. 1A-1F.

Figure 2:
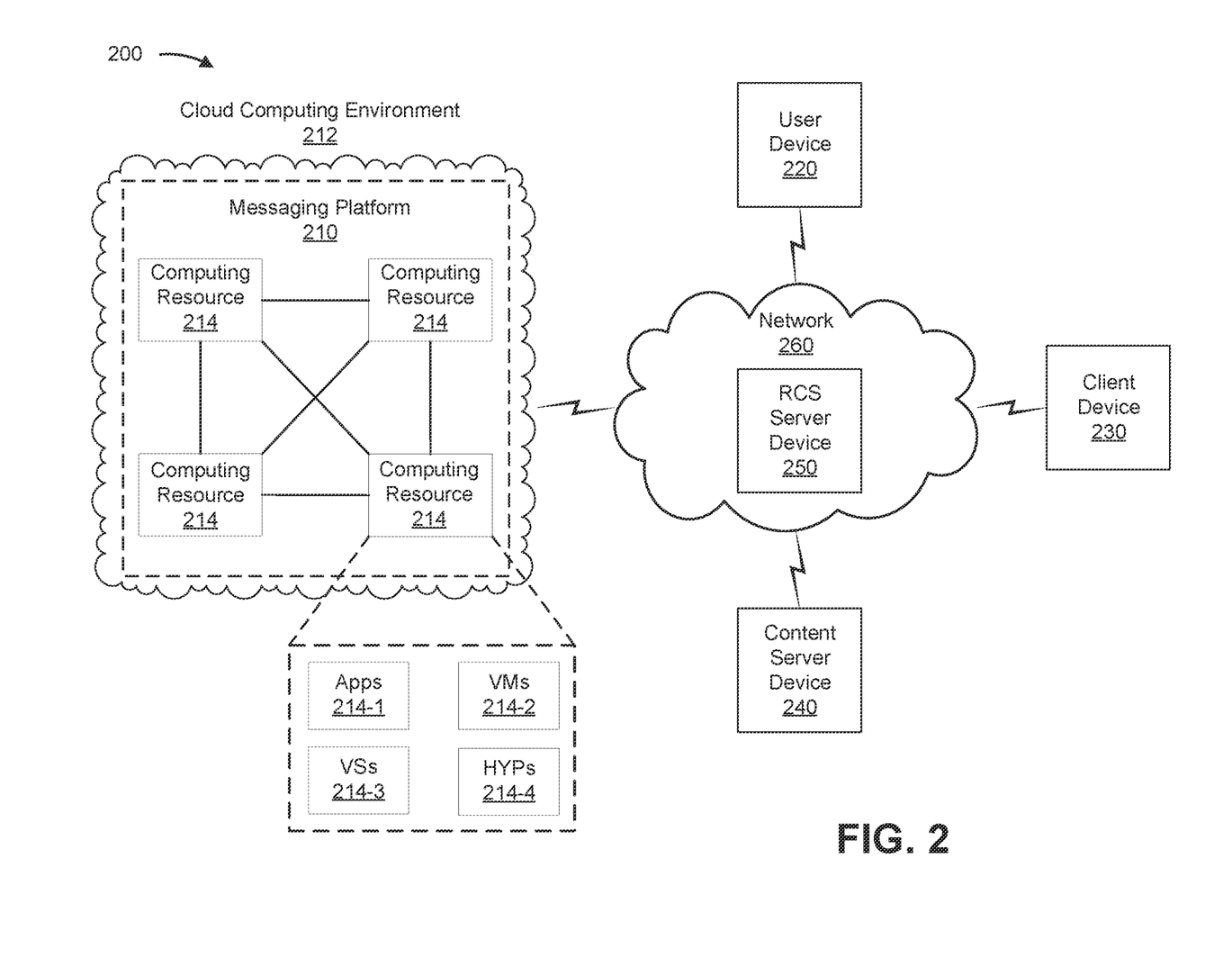
FIG. 2 is a diagram of an example environment in which systems and/or methods described herein may be implemented.

FIG. 2 is a diagram of an example environment 200 in which systems and/or methods, described herein, may be implemented. As shown in FIG. 2, environment 200 may include the messaging platform 210, the user device 220, the client device 230, the content server device 240, the RCS server device 250, and/or a network 260. Devices of environment 200 may interconnect via wired connections, wireless connections, or a combination of wired and wireless connections.

Messaging platform 210 includes one or more devices capable of including enriched calling information in RCS messaging. In some implementations, the messaging platform 210 may support messaging as a platform (MaaP). In some implementations, messaging platform 210 may be designed to be modular such that certain software components may be swapped in or out depending on a particular need. As such, messaging platform 210 may be easily and/or quickly reconfigured for different uses. In some implementations, messaging platform 210 may receive information from and/or transmit information to user device 220, client device 230, content server device 240, and/or RCS server device 250, such as via network 260.

In some implementations, as shown, messaging platform 210 may be hosted in a cloud computing environment 212.

Notably, while implementations described herein describe messaging platform 210 as being hosted in cloud computing environment 212, in some implementations, messaging platform 210 may be non-cloud-based (i.e., may be implemented outside of a cloud computing environment) or may be partially cloud-based.

Cloud computing environment 212 includes an environment that hosts messaging platform 210. Cloud computing environment 212 may provide computation, software, data access, storage, etc. services that do not require end-user knowledge of a physical location and configuration of system(s) and/or device(s) that hosts messaging platform 210. As shown, cloud computing environment 212 may include a group of computing resources 214 (referred to collectively as "computing resources 214" and individually as "computing resource 214").

Computing resource 214 includes one or more personal computers, workstation computers, server devices, or other types of computation and/or communication devices. In some implementations, computing resource 214 may host messaging platform 210. The cloud resources may include compute instances executing in computing resource 214, storage devices provided in computing resource 214, data transfer devices provided by computing resource 214, etc. In some implementations, computing resource 214 may communicate with other computing resources 214 via wired connections, wireless connections, or a combination of wired and wireless connections.

As further shown in FIG. 2, computing resource 214 includes a group of cloud resources, such as one or more applications ("APPs") 214-1, one or more virtual machines ("VMs") 214-2, virtualized storage ("VSs") 214-3, one or more hypervisors ("HYPs") 214-4, and/or the like.

Application 214-1 includes one or more software applications that may be provided to or accessed by user device 220, client device 230, content server device 240, and/or RCS server device 250. Application 214-1 may eliminate a need to install and execute the software applications on user device 220, client device 230, content server device 240, and/or RCS server device 250. For example, application 214-1 may include software associated with messaging platform 210 and/or any other software capable of being provided via cloud computing environment 212. In some implementations, one application 214-1 may send/receive information to/from one or more other applications 214-1, via virtual machine 214-2.

Virtual machine 214-2 includes a software implementation of a machine (e.g., a computer) that executes programs like a physical machine. Virtual machine 214-2 may be either a system virtual machine or a process virtual machine, depending upon use and degree of correspondence to any real machine by virtual machine 214-2. A system virtual machine may provide a complete system platform that supports execution of a complete operating system ("OS"). A process virtual machine may execute a single program, and may support a single process. In some implementations, virtual machine 214-2 may execute on behalf of a user (e.g., a user of user device 220), and may manage infrastructure of cloud computing environment 212, such as data management, synchronization, or long-duration data transfers.

Virtualized storage 214-3 includes one or more storage systems and/or one or more devices that use virtualization techniques within the storage systems or devices of computing resource 214. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 214-4 may provide hardware virtualization techniques that allow multiple operating systems (e.g., "guest operating systems") to execute concurrently on a host computer, such as computing resource 214. Hypervisor 214-4 may present a virtual operating platform to the guest operating systems, and may manage the execution of the guest operating systems. Multiple instances of a variety of operating systems may share virtualized hardware resources.

User device 220 includes one or more devices capable of receiving, generating, storing, processing, and/or providing information, such as information described herein. For example, user device 220 may include a computer (e.g., a desktop computer, a laptop computer, a tablet computer, a handheld computer, a server device, etc.), a mobile phone (e.g., a smart phone, a radiotelephone, etc.), an internet of things (IoT) device or smart appliance, a set-top box, a gaming device, a wearable device (e.g., smart glasses), or a similar device. In some implementations, user device 220 may receive information from and/or transmit information to messaging platform 210, client device 230, content server device 240, and/or RCS server device 250, such as via network 260.

Client device 230 includes one or more devices capable of receiving, generating, storing, processing, and/or providing information, such as information described herein. For example, client device 230 may include a computer (e.g., a desktop computer, a laptop computer, a tablet computer, a handheld computer, a server device, etc.), a mobile phone (e.g., a smart phone, a radiotelephone, etc.), a server device, a cloud device, or a similar device. In some implementations, client device 230 may receive information from and/or transmit information to messaging platform 210, user device 220, content server device 240, and/or RCS server device 250, such as via network 260.

Content server device 240 includes one or more devices capable of receiving, generating, storing, processing, and/or providing information, such as information described herein. For example, content server device 240 may include a laptop computer, a tablet computer, a desktop computer, a server, a group of servers, or a similar type of device. In some implementations, content server device 240 may include a data structure for storing elements of enriched calling information. In some implementations, content server device 240 may receive information from and/or transmit information to messaging platform 210, user device 220, client device 230, and/or RCS server device 250, such as via network 260.

RCS server device 250 includes one or more devices capable of receiving, generating, storing, processing, and/or providing information, such as information described herein. For example, RCS server device 250 may include a laptop computer, a tablet computer, a desktop computer, a server, a group of servers, or a similar type of device. In some implementations, RCS server device 250 may be included in and/or associated with network 260 (e.g., RCS server device 250 may be included in or associated with an Internet Protocol (IP) multimedia subsystem (IMS core) of network 260). In some implementations, content server device 240 may receive information from and/or transmit information to messaging platform 210, user device 220, client device 230, and/or content server device 240, such as via network 260.

Network 260 includes one or more wired and/or wireless networks. For example, network 260 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the internet, a fiber optic-based network, a cloud computing network, a mesh network and/or the like, and/or a combination of these or other types of networks.

The number and arrangement of devices and networks shown in FIG. 2 are provided as one or more examples. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
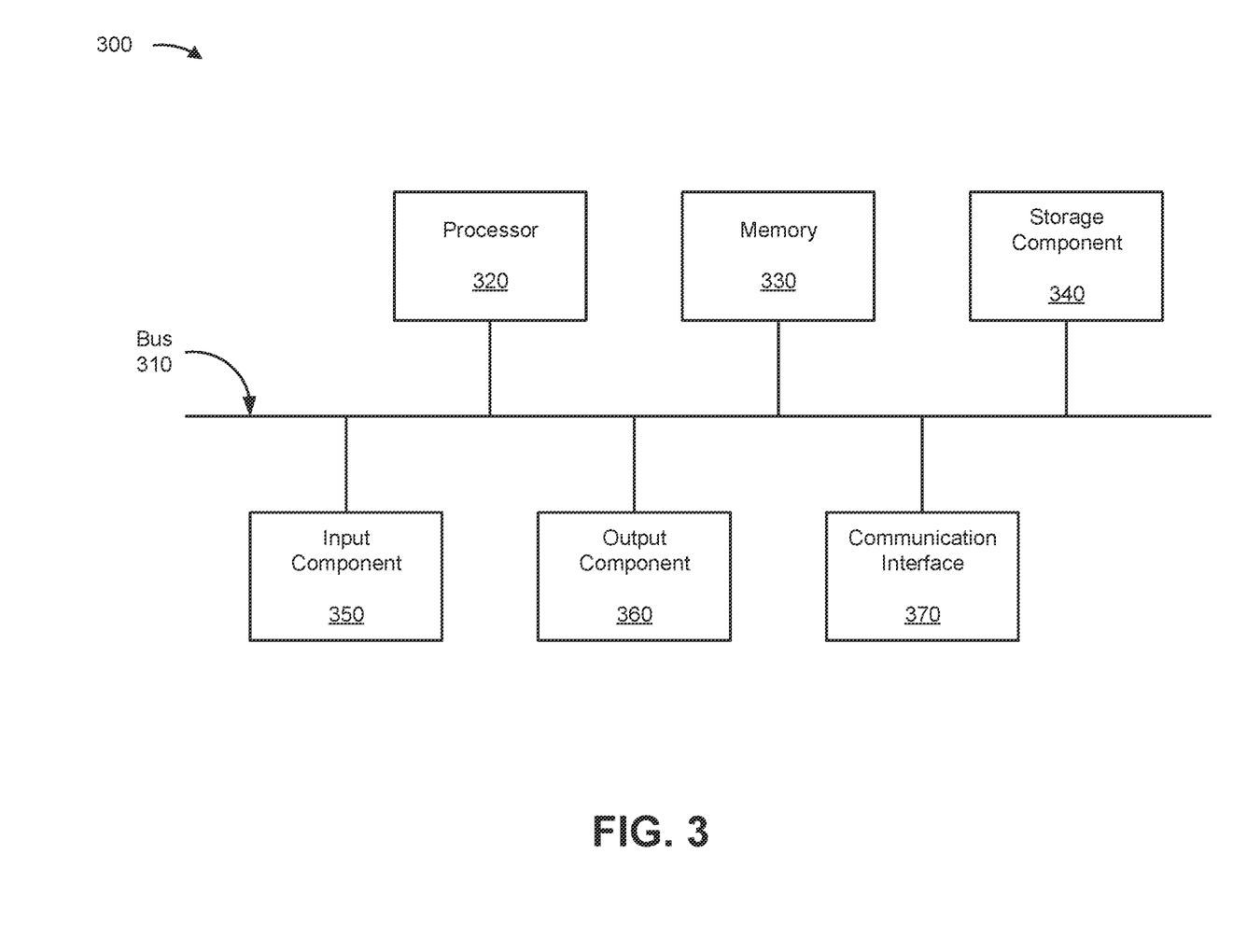
FIG. 3 is a diagram of example components of one or more devices of FIG. 2.

FIG. 3 is a diagram of example components of a device 300. Device 300 may correspond to messaging platform 210, user device 220, client device 230, content server device 240, and/or RCS server device 250. In some implementations messaging platform 210, user device 220, client device 230, content server device 240, and/or RCS server device 250 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among multiple components of device 300. Processor 320 is implemented in hardware, firmware, and/or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a component for determining location (e.g., a global positioning system (GPS) component) and/or a sensor (e.g., an accelerometer, a gyroscope, an actuator, another type of positional or environmental sensor, and/or the like). Output component 360 includes a component that provides output information from device 300 (via, e.g., a display, a speaker, a haptic feedback component, an audio or visual indicator, and/or the like).

Communication interface 370 includes a transceiver-like component (e.g., a transceiver, a separate receiver, a separate transmitter, and/or the like) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a wireless local area network interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. As used herein, the term "computer-readable medium" refers to a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
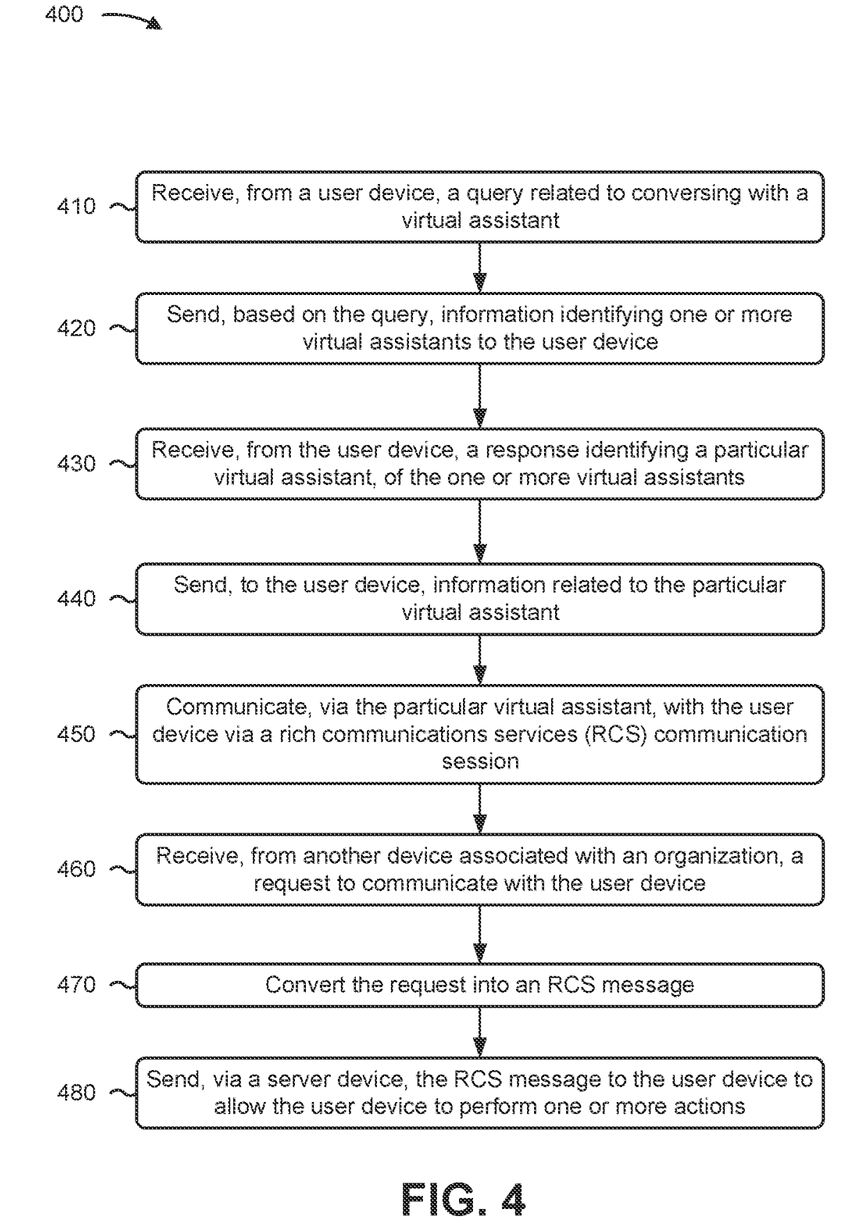
FIGS. 4-5 are flowcharts of example processes for including enriched calling information in rich communications services (RCS) messaging.

FIG. 4 is a flow chart of an example process 400 for including enriched calling information in rich communications services (RCS) messaging. In some implementations, one or more process blocks of FIG. 4 may be performed by a device, such as a messaging platform (e.g., messaging platform 210). In some implementations, one or more process blocks of FIG. 4 may be performed by another device or a group of devices separate from or including the device, such as a user device (e.g., user device 220), a client device (e.g., client device 230), a content server device (e.g., content server device 240), an RCS server device (e.g., RCS server device 250), and/or the like.

As shown in FIG. 4, process 400 may include receiving, from a user device, a query related to conversing with a virtual assistant (block 410). For example, the device (e.g., using processor 320, memory 330, storage component 340, input component 350, output component 360, communication interface 370, and/or the like) may receive, from a user device, a query related to conversing with a virtual assistant, as described above. The query may be an HTTP message.

As further shown in FIG. 4, process 400 may include sending, based on the query, information identifying one or more virtual assistants to the user device (block 420). For example, the device (e.g., using processor 320, memory 330, storage component 340, input component 350, output component 360, communication interface 370, and/or the like) may send, based on the query, information identifying one or more virtual assistants to the user device, as described above.

As further shown in FIG. 4, process 400 may include receiving, from the user device, a response identifying a particular virtual assistant, of the one or more virtual assistants (block 430). For example, the device (e.g., using processor 320, memory 330, storage component 340, input component 350, output component 360, communication interface 370, and/or the like) may receive, from the user device, a response identifying a particular virtual assistant, of the one or more virtual assistants, as described above. In some implementations, the virtual assistant is associated with an organization. The response may be an HTTP message and may indicate a request to initiate an RCS communication session with the virtual assistant. The device may initiate, based on the response, the RCS communication session.

As further shown in FIG. 4, process 400 may include sending, to the user device, information related to the particular virtual assistant (block 440). For example, the device (e.g., using processor 320, memory 330, storage component 340, input component 350, output component 360, communication interface 370, and/or the like) may send, to the user device, information related to the particular virtual assistant, as described above. The information related to the particular virtual assistant may include a media item associated with the particular virtual assistant or the organization; a verified signature associated with the particular virtual assistant or the organization; a URL associated with the particular virtual assistant or the organization; a location associated with the particular virtual assistant or the organization; and/or the like.

As further shown in FIG. 4, process 400 may include communicating, via the particular virtual assistant, with the user device via an RCS communication session (block 450). For example, the device (e.g., using processor 320, memory 330, storage component 340, input component 350, output component 360, communication interface 370, and/or the like) may communicate, via the particular virtual assistant, with the user device via an RCS communication session, as described above.

As further shown in FIG. 4, process 400 may include receiving, from another device associated with an organization, a request to communicate with the user device (block 460). For example, the device (e.g., using processor 320, memory 330, storage component 340, input component 350, output component 360, communication interface 370, and/or the like) may receive, from another device associated with an organization, a request to communicate with the user device, as described above. The request may be an HTTP message and may include enriched calling information that includes information indicating a priority of the request, information indicating a subject of the request, a media item associated with the organization; a URL associated with the media item; a verified signature associated with the organization; a URL associated with the organization; a location associated with the organization; and/or the like.

As further shown in FIG. 4, process 400 may include converting the request into an RCS message (block 470). For example, the device (e.g., using processor 320, memory 330, storage component 340, input component 350, output component 360, communication interface 370, and/or the like) may convert the request into an RCS message, as described above. The RCS message may be a SIP message and may include the enriched calling information.

In some implementations, when converting the request into the RCS message, the device may send one or more elements of the enriched calling information to another server device; receive, from the other server device, one or more URLs respectively associated with the one or more elements; and cause the one or more elements to be removed from the enriched calling information and the one or more URLs to be added to the enriched calling information. In some implementations, when converting the request into the RCS message, the device may identify a media item included in the enriched calling information; remove the media item from the enriched calling information; send the media item to another server device; receive, from the other server device, a URL associated with the media item; add the URL associated with the media item to the enriched calling information; and cause the RCS message to include the enriched calling information.

As further shown in FIG. 4, process 400 may include sending, via a server device, the RCS message to the user device to allow the user device to perform one or more actions (block 480). For example, the device (e.g., using processor 320, memory 330, storage component 340, input component 350, output component 360, communication interface 370, and/or the like) may send, via a server device, the RCS message to the user device to allow the user device to perform one or more actions, as described above. The server device may be associated with an IMS core. The one or more actions may include displaying, on a display of the user device, at least some of the enriched calling information; displaying, on the display of the user device, a notification concerning the enriched calling information; determining not to display any of the enriched calling information; allowing an additional RCS communication session to be established between the user device and the other device; disallowing an additional RCS communication session to be established between the user device and the other device; and/or the like.

Process 400 may include additional implementations, such as any single implementation or any combination of implementations described in connection with one or more other processes described elsewhere herein.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
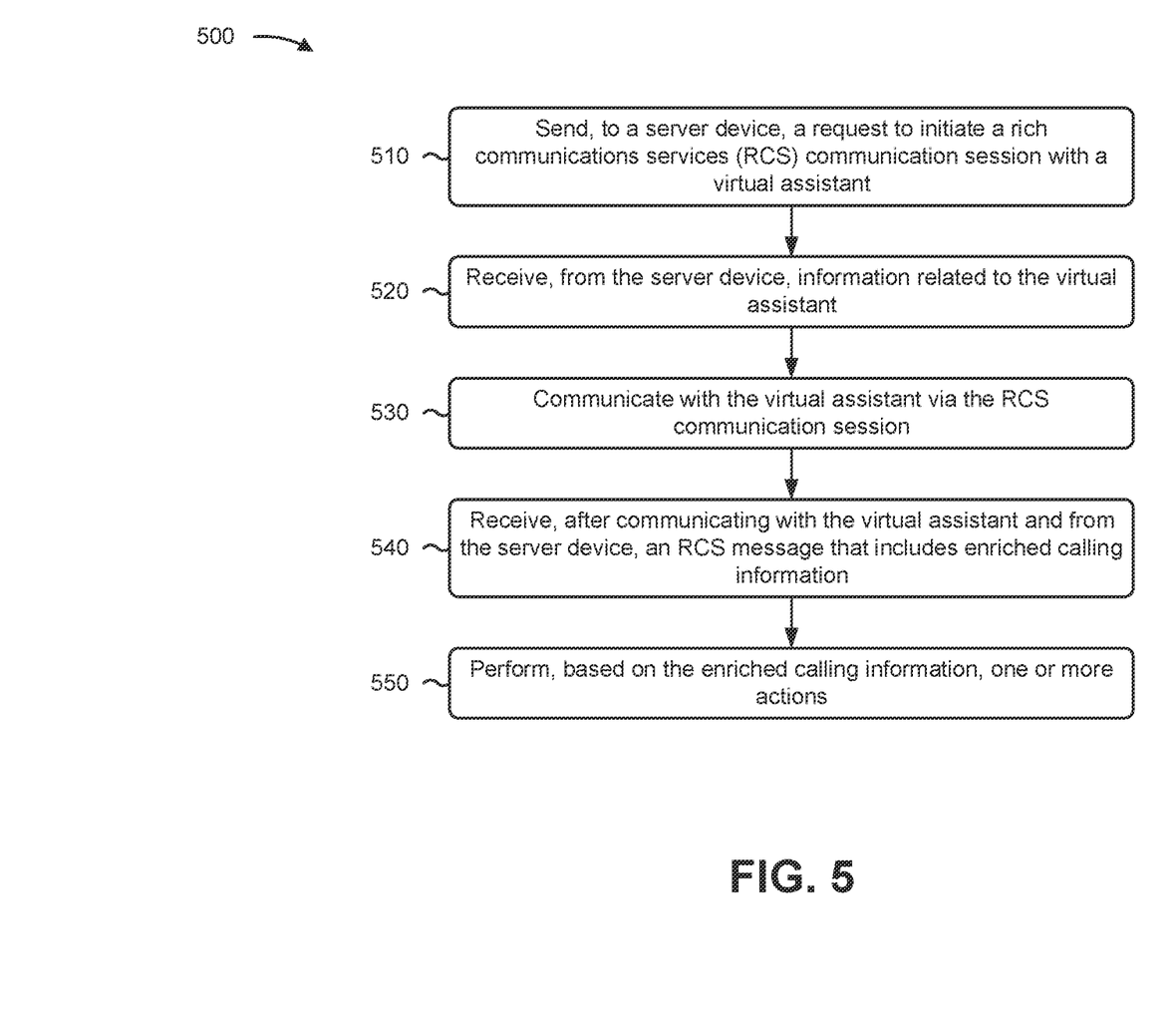

FIG. 5 is a flow chart of an example process 500 for including enriched calling information in RCS messaging. In some implementations, one or more process blocks of FIG. 5 may be performed by a user device (e.g., user device 220). In some implementations, one or more process blocks of FIG. 5 may be performed by another device or a group of devices separate from or including the device, such as a messaging platform (e.g., messaging platform 210), a client device (e.g., client device 230), a content server device (e.g., content server device 240), a RCS server device (e.g., RCS server device 250), and/or the like.

As shown in FIG. 5, process 500 may include sending, to a server device, a request to initiate an RCS communication session with a virtual assistant (block 510). For example, the user device (e.g., using processor 320, memory 330, storage component 340, input component 350, output component 360, communication interface 370, and/or the like) may send, to a server device, a request to initiate an RCS communication session with a virtual assistant, as described above.

As further shown in FIG. 5, process 500 may include receiving, from the server device, information related to the virtual assistant (block 520). For example, the user device (e.g., using processor 320, memory 330, storage component 340, input component 350, output component 360, communication interface 370, and/or the like) may receive, from the server device, information related to the virtual assistant, as described above. The information related to the virtual assistant may include a media item associated with the virtual assistant; a verified signature associated with the virtual assistant; a URL associated with the virtual assistant; a location associated with the virtual assistant; and/or the like.

As further shown in FIG. 5, process 500 may include communicating with the virtual assistant via the RCS communication session (block 530). For example, the user device (e.g., using processor 320, memory 330, storage component 340, input component 350, output component 360, communication interface 370, and/or the like) may communicate with the virtual assistant via the RCS communication session, as described above.

As further shown in FIG. 5, process 500 may include receiving, after communicating with the virtual assistant and from the server device, an RCS message that includes enriched calling information (block 540). For example, the device (e.g., using processor 320, memory 330, storage component 340, input component 350, output component 360, communication interface 370, and/or the like) may receive, after communicating with the virtual assistant and from the server device, an RCS message that includes enriched calling information, as described above. The enriched information may include a media item associated with an organization; a URL associated with the media item; a verified signature associated with the organization; a URL associated with the organization; a location associated with the organization; and/or the like.

As further shown in FIG. 5, process 500 may include performing, based on the enriched calling information, one or more actions (block 550). For example, the device (e.g., using processor 320, memory 330, storage component 340, input component 350, output component 360, communication interface 370, and/or the like) may perform, based on the enriched calling information, one or more actions, as described above.

For example, the user device may identify one or more first elements included in the information related to the virtual assistant; identify one or more second elements included in the enriched calling information; determine whether at least one first element, of the one or more first elements, matches at least one second element, of the one or more second elements; and perform, based on determining whether the at least one first element matches the at least one second element, the one or more actions. As another example, the user device may determine that one or more elements of the information related to the virtual assistant match one or more elements of the enriched calling information and may cause, based on determining that the one or more elements of the information related to the virtual assistant match the one or more elements of the enriched calling information, at least one element of the one or more elements of the enriched calling information to be displayed on a display of the user device. In another example, the user device may determine that the information related to the virtual assistant does not match the enriched calling information and may determine, based on determining that the information related to the virtual assistant does not match the enriched calling information, that the user device is not to display the enriched calling information on a display of the user device.

Process 500 may include additional implementations, such as any single implementation or any combination of implementations described in connection with one or more other processes described elsewhere herein.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

Certain user interfaces have been described herein and/or shown in the figures. A user interface may include a graphical user interface, a non-graphical user interface, a text-based user interface, and/or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
   receiving, by a device, a request to communicate with a user device,
      wherein the request includes enriched calling information that comprises one or more elements;
   converting, by the device, the request into a rich communication services (RCS) message based on replacing the one or more elements of the enriched calling information with a uniform resource locator (URL) associated with the one or more elements; and
   sending, by the device, the RCS message to the user device.

2. The method of claim 1, wherein the one or more elements include:
   information regarding a priority of the request,
   information indicating a subject of the request,
   a media item,
   a URL associated with the media item,
   a verified signature associated with an organization associated with the request,
   a URL associated with the organization, or
   information identifying a location associated with the organization.

3. The method of claim 1, wherein converting the request into the RCS message includes:
   sending, to a content server device, the one or more elements, and
   receiving, from the content server device, the URL associated with the one or more elements.

4. The method of claim 1, further comprising:
   sending, to the user device, information related to a virtual assistant; and
   wherein the RCS message includes information that matches the information related to the virtual assistant.

5. The method of claim 4, wherein the virtual assistant is associated with an organization, and
   wherein the request is associated with the organization.

6. The method of claim 1, further comprising:
   causing the RCS message to include the enriched calling information.

7. The method of claim 1, wherein the RCS message includes a session initiation protocol (SIP) message.

8. A non-transitory computer-readable medium storing a set of instructions, the set of instructions comprising:
   one or more instructions that, when executed by one or more processors of a device, cause the device to:
      receive a request to communicate with a user device,
         wherein the request includes enriched calling information that comprises one or more elements:
      convert the request into a rich communication services (RCS) message based on replacing the one or more elements of the enriched calling information with a uniform resource locator (URL) associated with the one or more elements; and
      send the RCS message to the user device.

9. The non-transitory computer-readable medium of claim 8, wherein the one or more elements include:
   information regarding a priority of the request,
   information indicating a subject of the request,
   a media item,
   a URL associated with the media item,
   a verified signature associated with an organization associated with the request,
   a URL associated with the organization, or
   information identifying a location associated with the organization.

10. The non-transitory computer-readable medium of claim 8, wherein the one or more instructions, that cause the device to convert the request into the RCS message, cause the device to:
    send, to a content server device, the one or more elements, and
    receive, from the content server device, the URL associated with the one or more elements.

11. The non-transitory computer-readable medium of claim 8, wherein the one or more instructions further cause the device to:
    send, to the user device, information related to a virtual assistant; and
    wherein the RCS message includes information that matches the information related to the virtual assistant.

12. The non-transitory computer-readable medium of claim 11, wherein the virtual assistant is associated with an organization, and
    wherein the request is associated with the organization.

13. The non-transitory computer-readable medium of claim 8, wherein the one or more instructions further cause the device to:
    cause the RCS message to include the enriched calling information.

14. The non-transitory computer-readable medium of claim 8, wherein the RCS message includes a session initiation protocol (SIP) message.

15. A device, comprising:
one or more processors configured to:
receive a request to communicate with a user device, wherein the request includes enriched calling information that comprises one or more elements;
convert the request into a rich communication services (RCS) message based on replacing the one or more elements of the enriched calling information with a uniform resource locator (URL) associated with the one or more elements; and
send the RCS message to the user device.

16. The device of claim 15, wherein the one or more elements include:
information regarding a priority of the request,
information indicating a subject of the request,
a media item,
a URL associated with the media item,
a verified signature associated with an organization associated with the request,
a URL associated with the organization, or
information identifying a location associated with the organization.

17. The device of claim 15, wherein the one or more processors, to convert the request into the RCS message, are configured to:
send, to a content server device, the one or more elements, and
receive, from the content server device, the URL associated with the one or more elements.

18. The device of claim 15, wherein the one or more processors are further configured to:
send, to the user device, information related to a virtual assistant; and
wherein the RCS message includes information that matches the information related to the virtual assistant.

19. The device of claim 18, wherein the virtual assistant is associated with an organization, and
wherein the request is associated with the organization.

20. The device of claim 15, wherein the one or more processors are further configured to:
cause the RCS message to include the enriched calling information.

* * * * *